US012719703B2

(12) United States Patent
Tartan et al.

(10) Patent No.: US 12,719,703 B2
(45) Date of Patent: Aug. 25, 2026

(54) REVOKING ACCESS TO A NETWORK

(71) Applicant: nChain Licensing AG, Zug (CH)

(72) Inventors: Chloe Tartan, London (GB); Alexander Mackay, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 324 days.

(21) Appl. No.: 17/911,354

(22) PCT Filed: Feb. 12, 2021

(86) PCT No.: PCT/IB2021/051160
§ 371 (c)(1),
(2) Date: Sep. 13, 2022

(87) PCT Pub. No.: WO2021/181178
PCT Pub. Date: Sep. 16, 2021

(65) Prior Publication Data
US 2023/0127516 A1 Apr. 27, 2023

(30) Foreign Application Priority Data
Mar. 13, 2020 (GB) ..................................... 2003641

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3247* (2013.01)

(58) Field of Classification Search
CPC .... H04L 9/3268; H04L 9/0825; H04L 9/3247
See application file for complete search history.

(56) References Cited

U.S. PATENT DOCUMENTS 10,425,230 B1 9/2019 Tang et al.
10,536,537 B1 1/2020 Le et al.
(Continued)

FOREIGN PATENT DOCUMENTS

CN 109617922 A 4/2019
GB 2588659 5/2021
(Continued)

OTHER PUBLICATIONS

PCT/IB2021/051160, International Search Report and Written Opinion dated Apr. 26, 2021.
(Continued)

*Primary Examiner* — Dhairya A Patel
(74) *Attorney, Agent, or Firm* — Galvani Smith PLLC

(57) ABSTRACT

A computer-implemented method for revoking access to a first network, wherein the first network comprises a set of bridging nodes and a set of devices controllable by one or more of the set of bridging nodes, wherein each bridging node is also a respective node of a blockchain network, and wherein each bridging node and device is associated with a respective certificate granting access to the first network; the method being performed by a registration authority and comprising: obtaining an alert transaction, the alert transaction being a blockchain transaction and comprising a first output, the first output comprising an alert message identifying one or more bridging nodes and/or one or more devices; and revoking access to the first network by the identified one or more bridging nodes and/or one or more devices by revoking the respective certificate of the identified one or more bridging nodes and/or one or more devices.

19 Claims, 12 Drawing Sheets

(56) References Cited

U.S. PATENT DOCUMENTS

| | | | | |
|---|---|---|---|---|
| 10,812,975 | B1 | 10/2020 | Easwar et al. | |
| 10,911,243 | B1 * | 2/2021 | Griffin | H04L 9/3247 |
| 11,025,627 | B2 * | 6/2021 | Li | H04W 12/06 |
| 11,568,064 | B2 | 1/2023 | Krishnaswamy et al. | |
| 12,149,646 | B2 * | 11/2024 | MacKay | H04L 9/321 |
| 12,184,759 | B2 * | 12/2024 | MacKay | H04L 9/0822 |
| 2010/0036956 | A1 * | 2/2010 | Nishikawa | G06F 9/505 718/105 |
| 2013/0198521 | A1 * | 8/2013 | Wu | H04L 9/3263 713/175 |
| 2016/0292672 | A1 | 10/2016 | Fay et al. | |
| 2018/0039667 | A1 * | 2/2018 | Pierce | G06F 16/2365 |
| 2018/0191503 | A1 | 7/2018 | Alwar et al. | |
| 2018/0253702 | A1 | 9/2018 | Dowding | |
| 2018/0253703 | A1 | 9/2018 | Smith et al. | |
| 2018/0293583 | A1 | 10/2018 | Rhie et al. | |
| 2019/0130086 | A1 * | 5/2019 | Tovey | G07C 9/00896 |
| 2019/0199535 | A1 | 6/2019 | Falk | |
| 2019/0199787 | A1 | 6/2019 | Carver et al. | |
| 2019/0288850 | A1 | 9/2019 | Beecham et al. | |
| 2019/0332921 | A1 | 10/2019 | Rodriguez | |
| 2019/0354367 | A1 * | 11/2019 | Rodriguez Bravo | G06F 21/57 |
| 2020/0021569 | A1 | 1/2020 | Simons | |
| 2020/0027005 | A1 | 1/2020 | Harrison et al. | |
| 2020/0099529 | A1 | 3/2020 | Chan et al. | |
| 2020/0144158 | A1 | 5/2020 | Seo et al. | |
| 2020/0177373 | A1 | 6/2020 | Komandur et al. | |
| 2020/0204350 | A1 | 6/2020 | Kramer | |
| 2020/0213329 | A1 | 7/2020 | Simons | |
| 2020/0218815 | A1 | 7/2020 | Haque et al. | |
| 2020/0272945 | A1 | 8/2020 | Manamohan et al. | |
| 2020/0356397 | A1 | 11/2020 | Kumatagi et al. | |
| 2021/0083844 | A1 | 3/2021 | Knuhtsen et al. | |
| 2021/0144158 | A1 | 5/2021 | Gerards et al. | |
| 2021/0160067 | A1 * | 5/2021 | Liu | H04L 9/3239 |
| 2021/0211451 | A1 | 7/2021 | Alsharif et al. | |
| 2021/0226770 | A1 | 7/2021 | Huan et al. | |
| 2022/0052988 | A1 | 2/2022 | Gadnis et al. | |
| 2022/0174375 | A1 * | 6/2022 | Singhvi | H04M 15/00 |
| 2022/0215471 | A1 | 7/2022 | Simpson | |
| 2022/0393891 | A1 * | 12/2022 | Mackcay | H04L 9/321 |
| 2023/0089134 | A1 | 3/2023 | Wang et al. | |
| 2023/0098246 | A1 | 3/2023 | Simpson | |
| 2025/0086088 | A1 * | 3/2025 | Olsher | G06F 11/3457 |

FOREIGN PATENT DOCUMENTS

| | | | | |
|---|---|---|---|---|
| GB | 2588660 | | 5/2021 | |
| GB | 2592211 | A | 8/2021 | |
| GB | 2594684 | A | 11/2021 | |
| JP | 2005117174 | A | 4/2005 | |
| JP | 2018195154 | A | 12/2018 | |
| JP | 2019522264 | A | 8/2019 | |
| JP | 2019528590 | A | 10/2019 | |
| JP | 2020505799 | A | 2/2020 | |
| JP | 2020507222 | A | 3/2020 | |
| KR | 102569409 | B1 | 8/2023 | |
| WO | 2010149185 | A1 | 12/2010 | |
| WO | 2017145010 | | 8/2017 | |
| WO | 2018222066 | A1 | 12/2018 | |
| WO | 2019108438 | A1 | 6/2019 | |
| WO | 2020053565 | A1 | 3/2020 | |
| WO | 2021059057 | | 4/2021 | |
| WO | WO-2022037879 | A1 * | 2/2022 | G06F 21/64 |

OTHER PUBLICATIONS

GB2003641.4Combined Search and Examination Report dated Sep. 16, 2020.

Benhadj Djilali Hadjer et al: "Efficient Distributed Authentication and Access Control System Management for Internet of Things Using Blockchain", Jun. 21, 2019 (Jun. 21, 2019), Advances in Databases and Information Systems; [Lecture Notes in Computer Science; Lect. Notes Computer], Springer International Publishing, Cham, pp. 51-60, XP047511185, ISBN: 978-3-319-10403-4 [retrieved on Jun. 21, 2019] figure 1 table 1 p. 1-p. 8.

Zhong Lin et al: "A Flexible Instant Payment System Based on Blockchain", May 30, 2019 (May 30, 2019), Advances in Databases and Information Systems; [Lecture Notes in Computer Science; Lect. Notes Computer], Springer International Publishing, Cham, pp. 289-306, XP047511657, ISBN: 978-3-319-10403-4 [retrieved on May 30, 2019] abstract Sections 1+3.

James Vincent, Could Your Fridge Send You Spam? Security Researchers Report 'Internet of Things' Botnet, Independent, Jan. 20, 2014, pp. 1-5, Independent.co.uk/life-style/gadgets-and-tech/news/, United Kingdom.

Pieter Wuille, Hierarchical Deterministic Wallets, Feb. 11, 2012, Github, https://github.com/bitcoin/bips/blob/master/bip-0032.mediawiki.

What is a Botnet?, Preventing Botnet Attacks, Mar. 12, 2020, pp. 1-5, AO Kasperky Lab.

Wikipedia Contributors, DdoS mitigation, Mar. 13, 2020, pp. 1-2, Wikipedia, The Free Encyclopedia, https://en.wikipedia.org/wiki/DDoS_mitigation.

Westervelt, R, Botnet Masters Turn to Google, Social Networks to Avoid Detection, Tech Target, Nov. 10, 2009.

Android smartphones 'used for botnet', researchers say, BBC News, Technology, Jul. 5, 2012, https://www.bbc.co.uk/news/technology-18720565, United Kingdom.

Lewis Gudgeon et al: "SoK: Off The Chain Transactions", IACR International Association for Cryptologic Research, vol. 20190410:001850 Apr. 3, 2019 (Apr. 3, 2019), pp. 1-17, XP061032040, Retrieved from the Internet: URL: http://eprint.iacr.org/2019/360.pdf [retrieved on Apr. 3, 2019] abstract I-III.

Joseph Poon et al: "The Bitcoin Lightning Network: Scalable Off-Chain Instant Payments", Jan. 14, 2016 (Jan. 14, 2016), XP055358006, Retrieved from the Internet: URL : https//lightning.network/lightning-network paper.pdf abstract Sections 1-3.

Chaoge Liu et al., A Recoverable Hybrid C&C Botnet, Beijing University of Posts and Telecommunications, Institute of Computing Technology, Chinese Academy of Sciences, 2011, pp. 110-118, 6th International Conference on Malicious and Unwanted Software, IEEE.

Combined Search and Examination Report for Application No. GB2007191.6, mailed on Feb. 12, 2021, 12 pages.

Hang L., et al., "Design and Implementation of an Integrated IoT Blockchain Platform for Sensing Data Integrity," Sensors, 2019, vol. 19, No. 2228, 26 pages, XP055765284, DOI: 10.3390/s19102228.

Hu T., et al., "A Distributed Decision Mechanism for Controller Load Balancing Based on Switch Migration in SDN," China Communications, Oct. 2018, vol. 15, No. 10, pp. 129-142, XP011690935, ISSN: 1673-5447, DOI: 10.1109/CC.2018.8485475.

International Search Report and Written Opinion for Application No. PCT/EP2021/060506, mailed on Jun. 30, 2021, 15 pages.

Novo O., "Blockchain Meets IoT: An Architecture for Scalable Access Management in IoT," Journal of Internet of Things Class Files, Mar. 2018, vol. 14, No. 8, 12 pages, XP011680882, DOI: 10.1109/JIOT.2018.2812239.

* cited by examiner

Figure 7a

| $Tx1$ (certificate) | | | |
|---|---|---|---|
| Inputs | | Outputs | |
| Value | Input Script | Value | Output Script |
| $x$ | $< Sig_{PKreg} >$ $< PK_0 >$ | 0 | OP_FALSE OP_RETURN 0x4d494f54<br><Certificate data> |
| | | $x + \delta$ | OP_DUP OP_HASH160<br>$< H_{160}(PK_{reg}) >$ OP_EQUALVERIFY<br>OP_CHECKSIG |

Figure 7b

| Outputs | |
|---|---|
| Value | Output Script |
| 0 | OP_FALSE OP_RETURN OP_PUSHDATA1<br>*<payload length>*<br>0x4d49df54 – *IoT protocol identifier*<br>0x02 – *Payload type*<br>0x00000001 – *IoT software version number*<br>0x3dd5dfac...32 – *New device ID*<br>0x234a3789 ...22 – *New device Compressed Pubkey*<br>0x3ad21fac – *Device type*<br>0x00000004 – *Device IoT node type*<br>0x0000...06f – *IPv6 address and port number*<br>0x5664b456 – *UNIX time creation date*<br>0x5665b456 – *UNIX time certificate expiry date*<br>0x76d5335c......45 – *Additional information* |

Figure 9a

| $Tx$ - Alert Tx (partial-0) | | | |
|---|---|---|---|
| Inputs | | Outputs | |
| Value | Script | Value | Script |
| $x + \delta$ | $< Sig_{PK_1} >$ $< PK_1 >$ SIGHASH_ANYONECANPAY | 0 | OP_FALSE OP_RETURN <Payload data> |
| | | $3x$ | OP_DUP OP_HASH160 $< H_{160}(PK_M) >$ OP_EQUALVERIFY OP_CHECKSIG |

Figure 9b

| $Tx$ - Alert Tx (partial-1) | | | |
|---|---|---|---|
| Inputs | | Outputs | |
| Value | Script | Value | Script |
| $x + \delta$ | $< Sig_{PK_1} >$ $< PK_1 >$ SIGHASH_ANYONECANPAY | 0 | OP_FALSE OP_RETURN <Payload data> |
| $x$ | $< Sig_{PK_2} >$ $< PK_2 >$ SIGHASH_ANYONECANPAY | $3x$ | OP_DUP OP_HASH160 $< H_{160}(PK_M) >$ OP_EQUALVERIFY OP_CHECKSIG |

Figure 9c

| $Tx$ - Alert Tx (complete) | | | |
|---|---|---|---|
| Inputs | | Outputs | |
| Value | Script | Value | Script |
| $x + \delta$ | $< Sig_{PK_1} >$ $< PK_1 >$ SIGHASH_ANYONECANPAY | 0 | OP_FALSE OP_RETURN <Payload data> |
| $x$ | $< Sig_{PK_2} >$ $< PK_2 >$ SIGHASH_ANYONECANPAY | $3x$ | OP_DUP OP_HASH160 $< H_{160}(PK_M) >$ OP_EQUALVERIFY OP_CHECKSIG |
| $x$ | $< Sig_{PK_3} >$ $< PK_3 >$ SIGHASH_ALL | | |

Figure 10

| Outputs | |
|---|---|
| Value | Script |
| 0 | OP_FALSE OP_RETURN OP_PUSHDATA1 *<payload length>*<br><0x4d494f54 – *IOT protocol identifier (4 bytes)*<br>0x01 – *Payload type (1 byte)*<br>0x00000001 – *MIOT software version number (4 bytes)*<br>0x3dd5dfac…32 – *Device ID (32 bytes)*<br>$PK_4$ – *Device Pubkey*<br>0x4d348912…87 – *Device certificate location data (40 bytes)*<br>0x3ad21fac – *Alert message (4 bytes)*<br>0x5665b456 – *Status (4 bytes)*<br>0x5665b456 – *Prev. Status (4 bytes)* > |
| $x$ | OP_DUP OP_HASH160 $< H_{160}(PK_M) >$ OP_EQUALVERIFY OP_CHECKSIG |

Figure 11a

| $Tx$ – Alert Tx | | | |
|---|---|---|---|
| Inputs | | Outputs | |
| Value | Script | Value | Script |
| $\delta$ | $<Sig_{PK_1}><PK_1>$ | 0 | OP_FALSE OP_RETURN <Payload data> |
| | | $\delta$ | OP_2 $<PK_2><PK_3> \ldots <PK_n>$ OP_n OP_CHECKMULTISIG |

Figure 11b

| $Tx$ – Confirmation Tx | | | |
|---|---|---|---|
| Inputs | | Outputs | |
| Outpoint | Script | Value | Script |
| $Tx1 \mid\mid 1$ | $<Sig_{PK_2}>$ $<Sig_{PK_3}>$ | $\delta$ | OP_DUP OP_HASH160 $<H_{160}(PK_M)>$ OP_EQUALVERIFY OP_CHECKSIG |

Figure 12a

| $Tx$ – Alert Tx | | | |
|---|---|---|---|
| Inputs | | Outputs | |
| Value | Script | Value | Script |
| $\delta$ | $<Sig_{PK_1}><PK_1>$ | 0 | OP_FALSE OP_RETURN <*Payload data*> |
| | | $\delta$ | OP_0 OP_TOALTSTACK<br>OP_IF<br>OP_DUP OP_HASH160 $<H_{160}(PK_1)>$<br>OP_EQUALVERIFY OP_CHECKSIGVERIFY<br>OP_FROMALTSTACK OP_1ADD<br>OP_TOALTSTACK<br>OP_ENDIF<br>OP_IF<br>OP_DUP OP_HASH160 $<H_{160}(PK_2)>$<br>OP_EQUALVERIFY OP_CHECKSIGVERIFY<br>OP_FROMALTSTACK OP_1ADD<br>OP_TOALTSTACK<br>OP_ENDIF<br>OP_IF<br>OP_DUP OP_HASH160 $<H_{160}(PK_3)>$<br>OP_EQUALVERIFY OP_CHECKSIGVERIFY<br>OP_FROMALTSTACK OP_1ADD<br>OP_TOALTSTACK<br>OP_ENDIF<br><2> OP_FROMALTSTACK<br>OP_GREATERTHANOREQUAL |

Figure 12b

| $Tx$ – Confirmation Tx | | | |
|---|---|---|---|
| Inputs | | Outputs | |
| Outpoint | Script | Value | Script |
| $Tx1 \| \| 1$ | $<Sig_{PK_3}><PK_3><1>$<br><0><br>$<Sig_{PK_2}><PK_2><1>$ | $\delta$ | OP_DUP OP_HASH160 $<H_{160}(PK_M)>$<br>OP_EQUALVERIFY OP_CHECKSIG |

REVOKING ACCESS TO A NETWORK

CROSS REFERENCE TO RELATED APPLICATIONS

This application is the U.S. National Stage of International Application No. PCT/IB2021/051160 filed on Feb. 12, 2021, which claims the benefit of United Kingdom Patent Application No. 2003641.4, filed on Mar. 13, 2020, the contents of which are incorporated herein by reference in their entireties.

TECHNICAL FIELD

The present disclosure relates to methods for revoking access to a network, e.g. using blockchain transactions.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. a number of digital tokens. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes validate transactions and insert them into candidate blocks for which they attempt to identify a valid proof-of-work solution. perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

SUMMARY

Internet of Things (IoT) technology enables networks of physical devices to monitor events and exchange data without human intervention. Motivating the development of IoT technology is the necessity for real-time data collection and automatic control mechanisms for replacing conventional monitoring and control methods across a wide-range of industries. IoT systems generate large volumes of data and rely on systems with network scalability, strong cybersecurity, reliable connectivity and minimal network latency.

Currently, centralised architecture models are widely used to authenticate, authorize and connect nodes in an IoT network. Such models are vulnerable to attack and act as a single point of failure. If a centralized system is compromised, permission to access the IoT network could be granted to malicious devices and/or removed from existing devices. If a malicious device is granted access to the IoT network, that device could, for instance, harvest sensitive data or disrupt the network.

Peer-to-Peer (P2P) architectures offer a more secure and efficient solution compared to centralised architectures, whereby neighbours interact directly with one-another without using any centralized node or agent between them. Blockchain technology is the foundation for secure P2P communication and is promising to revolutionize the development of IoT systems. One advantage of utilizing the blockchain to build an IoT network is the ability grant access to the network using blockchain transactions. For instance, new peers (i.e. network nodes) can be bootstrapped into a P2P network, i.e. granted access to join the network, using blockchain transactions. This process involves the generation of a digital certificate for each node. If the certificate of a node is valid, the node can access the network and communicate with other nodes (e.g. other devices). Communicating with a node may include instructing the node to perform an action, or responding to other nodes on the network. If the certificate is not valid, the node is unable to access the network and communicate with (e.g. instruct) other nodes on the network. A registration authority may issue certificate from a dedicated public-private key pair ($sk_{Issue}$, $PK_{Issue}$).

A problem arises if a permissioned node (i.e. a node with access to the network) becomes faulty or is attacked by a malicious actor. An example consequence of a node becoming faulty or controlled by a malicious actor is that other nodes may be unable to instruct the faulty/malicious node to perform actions, or the faulty/malicious node may be unable to report back to other nodes that actions have been performed. Faulty/malicious nodes may inadvertently or maliciously (as the case may be) instruct other nodes on the network to perform detrimental actions, or they may falsely report their actions or status.

According to one aspect disclosed herein, there is provided a computer-implemented method for revoking access to a first network, wherein the first network comprises a set of bridging nodes and a set of devices controllable by one or more of the set of bridging nodes, wherein each bridging node is also a respective node of a blockchain network, and wherein each bridging node and device is associated with a respective certificate granting access to the first network; the method being performed by a registration authority and comprising: obtaining an alert transaction, the alert transaction being a blockchain transaction and comprising a first output, the first output comprising an alert message identifying one or more bridging nodes and/or one or more devices; and revoking access to the first network by the identified one or more bridging nodes and/or one or more devices by revoking the respective certificate of the identified one or more bridging nodes and/or one or more devices.

The first network (e.g. an IoT network) comprises one or more bridging nodes and one or more devices which can be controlled by one or more of the bridging nodes. The bridging nodes are also nodes of a blockchain network. That is, they are part of the IoT network and the blockchain network in the sense that they can connect both to the IoT network (e.g. to communicate with other network nodes and devices) and to the blockchain network (e.g. to transmit transactions to the blockchain and to identify and read from transactions recorded on the blockchain). These nodes act as a gateway or bridge between the first network and the blockchain network. They need not also have the roles of mining nodes, forwarding nodes or storage nodes of the blockchain network, though that is not excluded either. In some examples, one or more of the devices of the first network may also be a node of the blockchain network.

The registration authority (who may or may not a bridging node of the IoT network) is a node of the blockchain network. I.e. the registration authority is connected to the blockchain and is configured to transmit transactions to the blockchain network. The registration authority is responsible for granting certificates to nodes and devices, with those certificates then granting permission for a node or device to join the network.

The registration authority, in response to receiving the alert transaction, revokes the certificates of nodes or devices identified in the alert transaction, e.g. nodes that have become faulty or have acted maliciously. Once the certificate of a node or device has been revoked, that node or device can no longer access the network. In other words, a node or device whose certificate has been revoked cannot instruct other nodes to perform actions, and equally cannot be instructed to perform actions.

Certificates may be recorded in certificate (blockchain) transactions. For instance, each node may be granted a certificate (and therefore access to the network) by being issued a certificate contained within a blockchain transaction that is recorded on the blockchain.

Whilst the certificate transaction is linked with an unspent transaction output (UTXO), the certificate is deemed to be valid and the node is deemed to have access to the network. I.e. other nodes can check that a node issuing commands has a valid certificate (e.g. a valid certificate linked to a public key of that node). To revoke the certificate, the registration authority generates a revocation transaction that spends the UTXO linked with the certificate transaction. The certificate will no longer be linked with an unspent transaction output, e.g. the output containing the certificate will no longer appear in the UTXO set of the blockchain. Other nodes will be able to see that the revoked node no longer has a valid certificate, e.g. by querying the UTXO set, and will therefore not communicate with the revoked node, which includes no longer issuing commands to the revoked node or acting on commands received from the revoked node.

According to another aspect disclosed herein, there is provided a computer-implemented method for reporting a failed connection to a registration authority responsible for revoking access to a first network, wherein the first network comprises a set of bridging nodes and a set of devices controllable by one or more of the set of bridging nodes, wherein each bridging node is also a respective node of a blockchain network, and wherein each bridging node and device is associated with a respective certificate granting access to the first network; the method being performed by a first one of the bridging nodes and comprising: in response to a predetermined number of failed attempts at establishing a respective connection with one or more bridging nodes and/or one or more end devices, adding a digital signature of the first bridging node to an input of a first alert transaction, the first alert transaction being a blockchain transaction and comprising a first output, the first output comprising an alert message identifying the one or more bridging nodes and/or the one or more devices; and transmitting the first alert transaction to one, some or all of: a different one of the bridging nodes, the registration authority, and one or more nodes of the blockchain network for inclusion in the blockchain.

A node (the "first node") of the network may become aware (or suspect) that a different node or device has become faulty or has been attacked by a malicious actor if the first node can no longer communicate with the (suspected) faulty/malicious node. When the first node is unable to establish a connection with the faulty/malicious node, or experiences a number of failed attempts at establishing a connection with the faulty/malicious node, the first node signs an alert transaction which can be used to inform the registration authority of the faulty/malicious node. The first node may transmit the alert transaction to the blockchain, from which the registration authority can obtain the alert transaction. The first node may additionally or alternatively, transmit the alert transaction directly to the registration authority, e.g. via an off-chain communication channel. As another option, the first node may transmit the alert transaction to another node (a "second node") of the network. If the second node also experiences issues connecting with the faulty/malicious node, the second node can also sign the alert transaction. The second node can then forward the alert transaction to yet another node, to the registration authority, or to the blockchain network.

In some examples, the registration authority may only act on an alert transaction if it includes a threshold number of signature. That is, a minimum number of nodes have attested to experiences connection problems with the faulty/malicious node.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 7*a* and 7*b* schematically illustrate an example certificate transaction and an example certificate format;

FIGS. 9*a* to 9*c* schematically illustrate first examples alert transactions;

FIG. 10 schematically illustrates an example of the payload data of FIGS. 9*a* to 9*c;*

FIGS. 11*a* and 11*b* schematically illustrates a second example of an alert transaction and a corresponding confirmation transaction; and FIGS. 12*a* and 12*b* schematically illustrates a third example of an alert transaction and a corresponding confirmation transaction.

DETAILED DESCRIPTION OF EMBODIMENTS

Example System Overview

Figure 1:
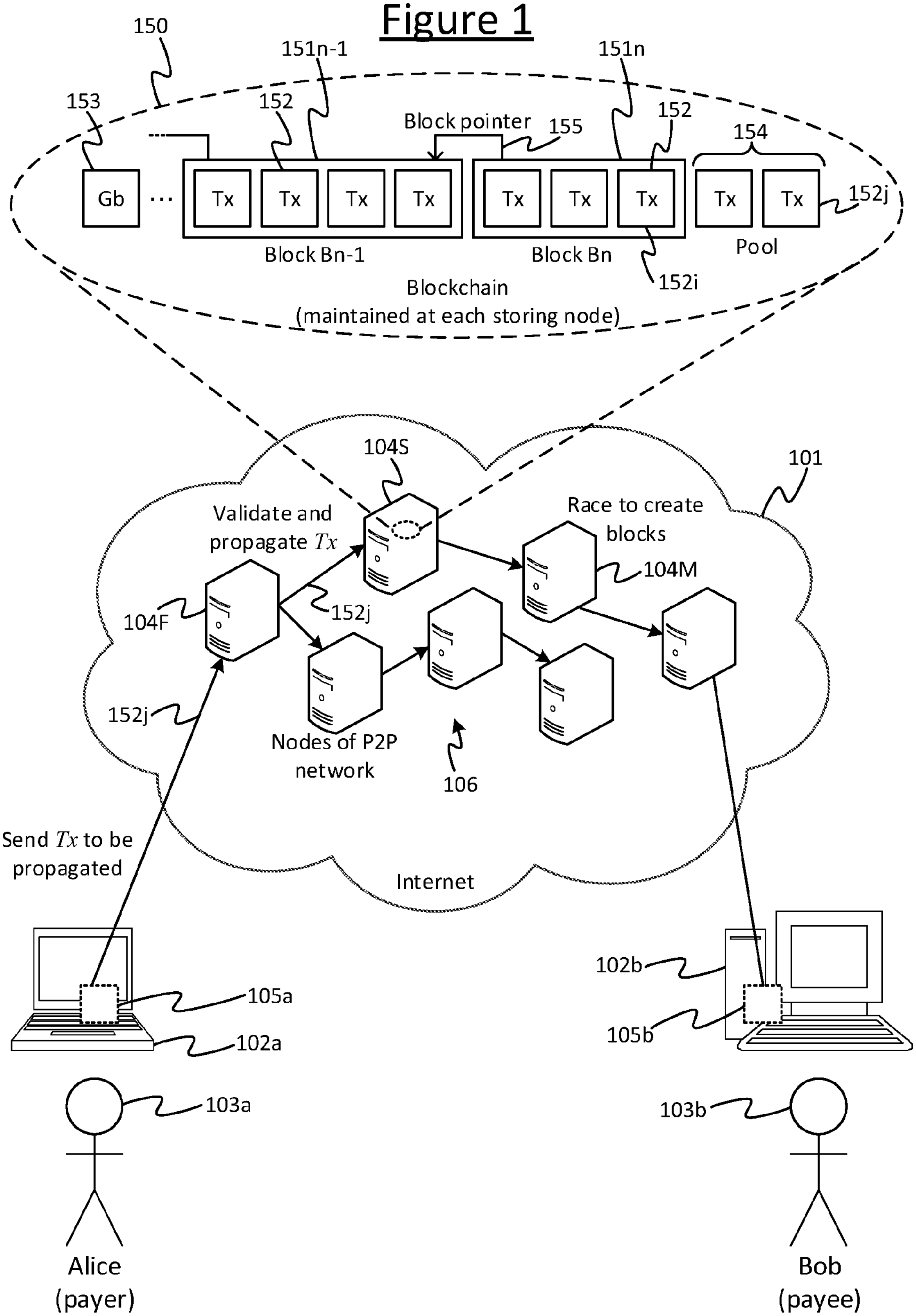
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction **152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104**.

In an output-based model, the definition of whether a given output (e.g. UTXO) is spent is whether it has yet been validly redeemed by the input of another, onward transaction **152*j* according to the node protocol. Another condition for a transaction to be valid is that the output of the preceding transition 152*i* which it attempts to spend or redeem has not already been spent/redeemed by another valid transaction. Again if not valid, the transaction 152*j*** will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block **151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106**, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block **151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150**.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block **151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n*** in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party **103*a* and his/her respective computer equipment 102***a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

UTXO-Based Model

Figure 2:
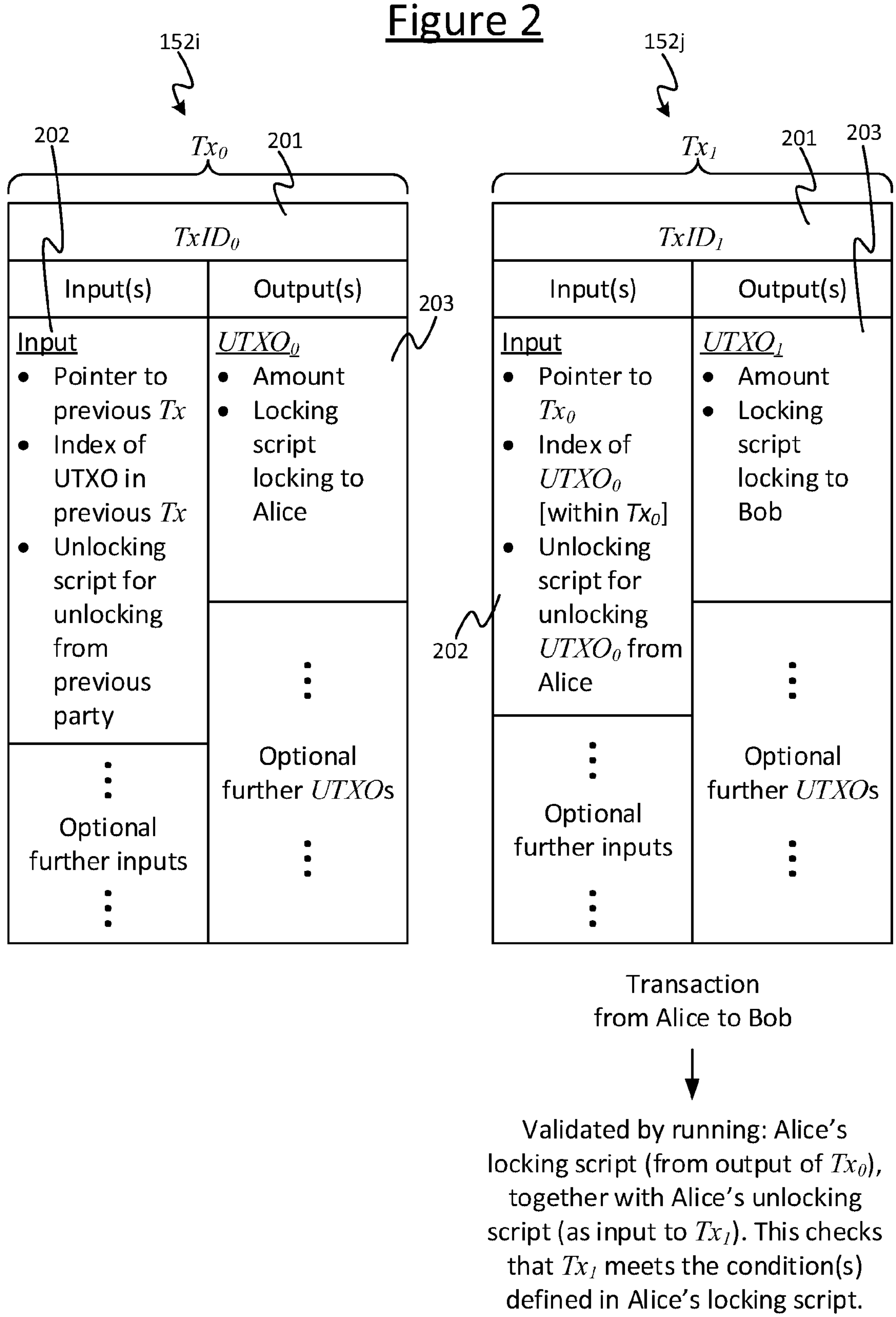
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103*a* wishes to create a transaction 152*j* transferring an amount of the digital asset in question to Bob 103*b*. In FIG. 2 Alice's new transaction 152*j* is labelled "$Tx_{x1}$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$ and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H(Pa)> OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
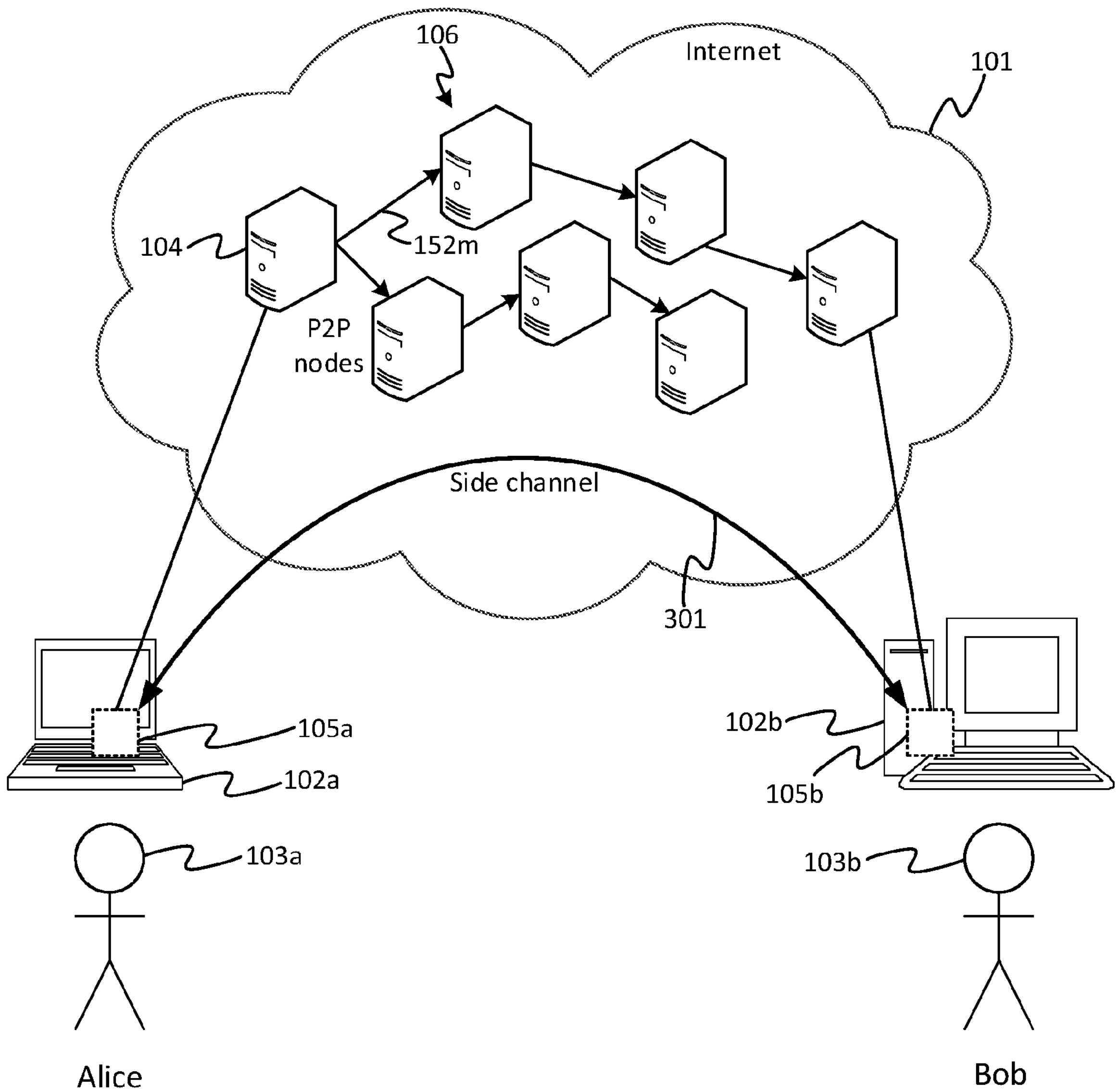
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102*a*, 120*b*, respectively, comprises additional communication functionality. That is, it enables Alice 103*a* to establish a separate side channel 301 with Bob 103*b* (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102*b*. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 4A:
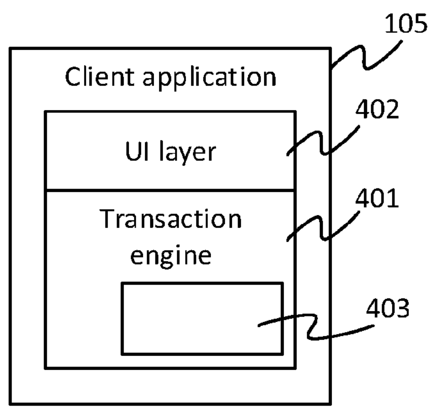
FIG. 4A is a schematic block diagram of a client application.

FIG. 4A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to be propagated through the P2P network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 4B:
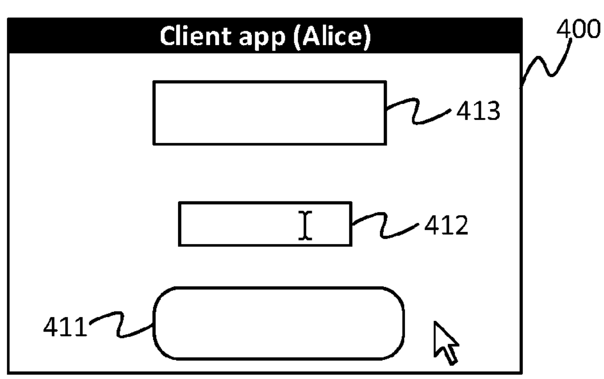
FIG. 4B is a schematic mock-up of an example user interface that may be presented by the client application of FIG. 4A, FIG. 5 schematically illustrates the overlap between an IoT network and a blockchain network.

FIG. 4B gives a mock-up of an example of the user interface (UI) 400 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 4B shows the UI 400 from Alice's perspective. The UI 400 may comprise one or more UI elements 411, 412, 413 rendered as distinct UI elements via the user output means.

For example, the UI elements may comprise one or more user-selectable elements 411 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to generate transactions and send them to another user (Bob), and to generate a signature of a transaction in accordance with the described embodiments.

Alternatively or additionally, the UI elements may comprise one or more data entry fields 412, through which the user can input data to be included in the generated transaction and/or a message to be signed. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 413 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 400 shown in FIG. 4B is only a schematized mock-up and in practice it may comprise one or more further UI elements, which for conciseness are not illustrated.

Granting Network Access

Figure 5:
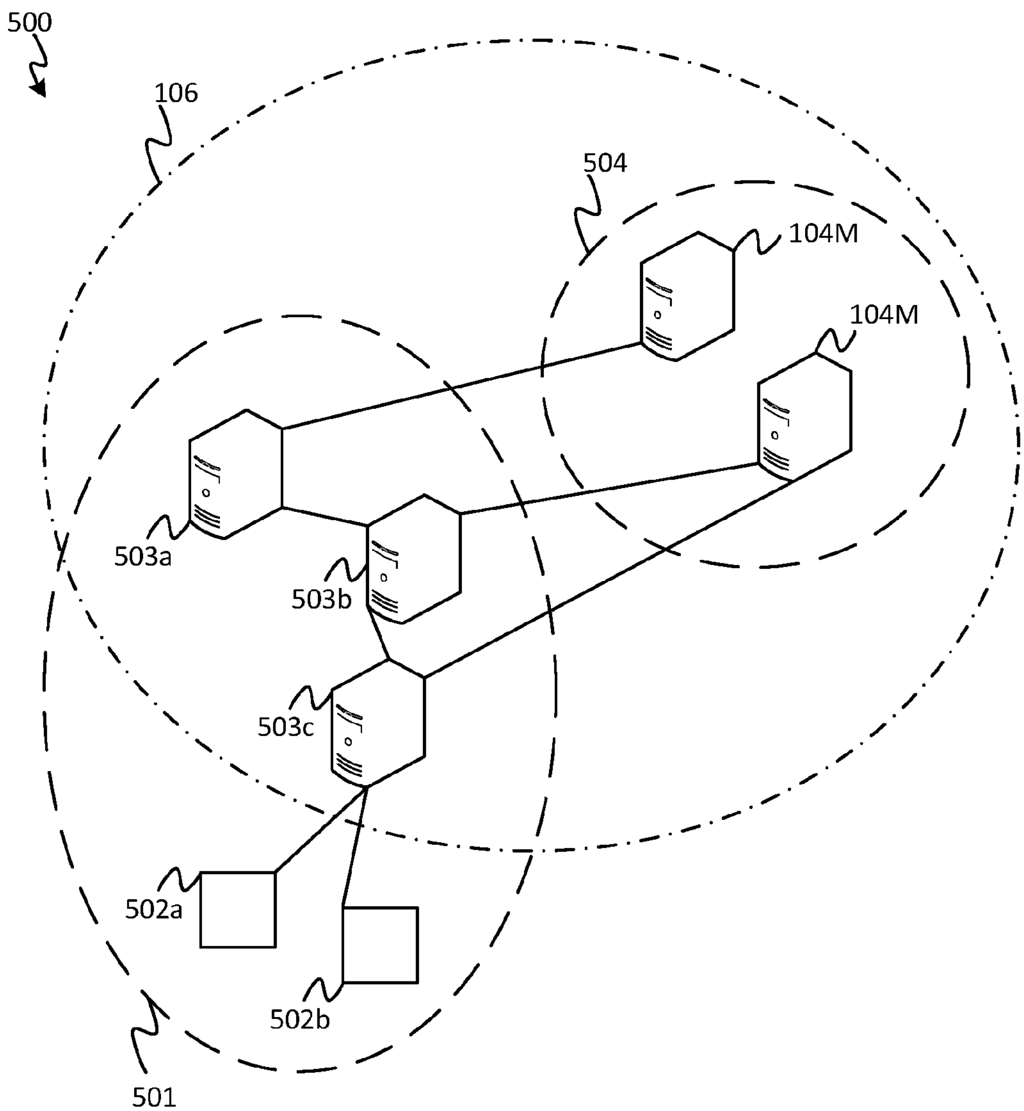

FIG. 5 illustrates an example system 500 for implementing embodiments of the present invention. The example system 500 comprises a first network 501 of one or more end devices (i.e. computing devices) 502 and one or more bridging nodes 503 (i.e. computing devices which run a blockchain client application 105 and therefore act as a bridge between the blockchain network 106 and the first network 501). For clarity, the first network 501 will be referred to as an IoT network, i.e. a network of computing devices interconnected by the internet. However, it will be appreciated that the first network need not be an IoT network and, in general, may be any P2P network. Typically the end devices 502 and bridging nodes 503 are embedded in everyday devices. An end device 502 may take one of a variety of forms, e.g. user devices (e.g. smart TVs, smart speakers, toys, wearables, etc.), smart appliances (e.g. fridges, washing machines, ovens, etc.), meters or sensors (e.g. smart thermostats, smart lighting, security sensors, etc.). Similarly, a bridging node 503 may also take a variety of forms, which may include, but is not limited to, the same forms as which an end device may take. A node 503 may also take the form of dedicated server equipment, a base station, an access point, a router, and so on. In some examples, each device may have a fixed network (e.g. IP) address. For instance, one, some or all of the end devices may be a stationary device (e.g. a smart light, or smart central heating controller, etc.), as opposed to a mobile device. In this example system 500, Alice 103*a* and Bob 103*b* each take the form of a bridging node 503.

The IoT network is a packet-switched network 101, typically a wide-area internetwork such as the Internet. The nodes 503 and devices 502 of the packet-switched network 101 are arranged to form a peer-to-peer (P2P) overlay network 501 within the packet-switched network 101. Each node 503 comprises respective computer equipment, each comprising respective processing apparatus comprising one or more processors, e.g. one or more central processing units (CPUs), accelerator processors, application specific processors and/or field programmable gate arrays (FPGAs). Each node 503 also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

Each node 503 of the IoT network is also a blockchain node 104. These nodes 503 are arranged as bridging nodes (gateway nodes) which act as a bridge (gateway) between the first network 501 and the blockchain network 106. A blockchain node 104 may be a "listening node". A listening node runs a client application 105 that keeps a full copy of the blockchain, validates and propagate new transactions and blocks but does not actively mine or generate new blocks. Alternatively, a node may be a "simplified payment verification node" (SPV node). An SPV node runs a lightweight client that can generate and broadcast bitcoin transactions and monitor addresses indirectly but does not keep a full copy of the blockchain.

Each node 503 of the IoT network is configured to control an end device 502 either directly or indirectly. A node 503 that is directly connected to an end device 502 can directly control that device. A node 503 that is not directly connected to an end device 502 can only indirectly control that device, e.g. by forwarding a control message to the end node via one or more intermediary nodes. Each node 503 is connected to one or more mining nodes 104M.

FIG. 5 also illustrates a network 504 of mining nodes 104M which is a subset of the blockchain network 106. Mining nodes have been discussed above with reference to FIGS. 1 to 3. The mining nodes 104M are configured to mine valid transactions (e.g. transactions transmitted from the IoT nodes) to the blockchain 150.

As shown in FIG. 5, the nodes 503 form part of both the P2P network 501 and the blockchain P2P network 106, whereas the mining nodes 104M form part of only the blockchain P2P network 106. Whilst the end devices 502 are shown in FIG. 5 as forming part of only the P2P IoT network 501, it is not excluded that the end devices 502 could also be blockchain nodes 104.

Figure 6:
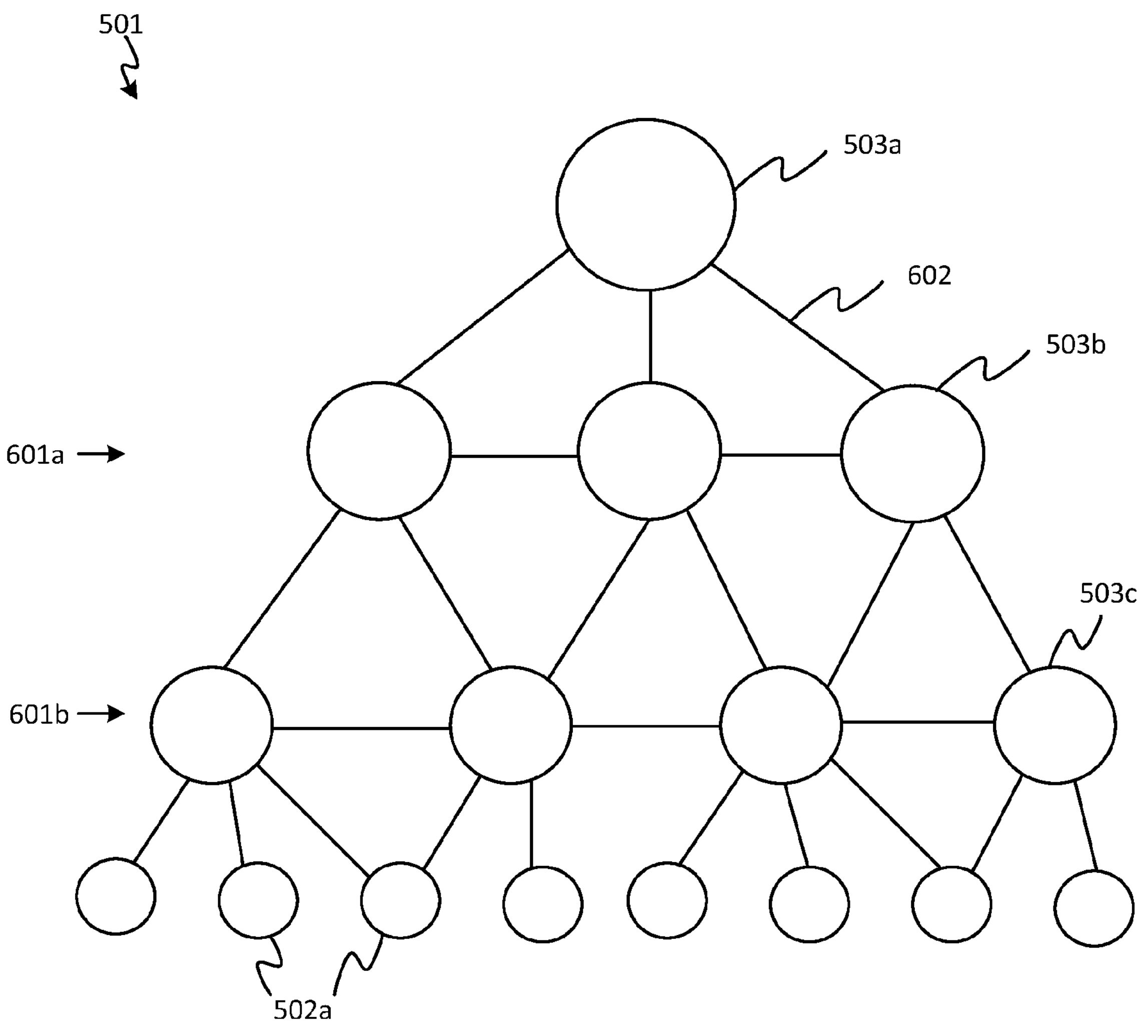
FIG. 6 schematically illustrates a hierarchical network topology.

FIG. 6 illustrates an example IoT network 501 topology. The IoT network 501 may control a master node 503*a*, one or more sets 601 of one or more intermediary nodes 503*b*, 503*c*, and a set of end devices 502. The master node 502*a* is configured to control one or more intermediary nodes 503*b*, 503*c*. If the IoT network 501 comprises multiple sets (e.g. layers) 601*a*, 601*b* of intermediary nodes, the master node 503*a* is configured to directly control the first set (layer) 601*a* of intermediary nodes ("server nodes" 503*b*) and to indirectly control one or more further sets (layers) 601*b* of intermediary nodes (e.g. a layer of "slave nodes" 503*c*). The master node 503*a* is a controlling node with the ability to override and control server and slave nodes. Each server node 503*b* is a node with the ability to control slave nodes 503*c*. Each slave node 503*c* is a node under the control of the server nodes 503*b* and the master node 503*a*. As an example, to instruct end device 502*a*, the master node 503*a* would issue a command to slave node 503*c* via servant node 503*b*.

Whilst the example IoT network of FIG. 6 shows only two layers of intermediary nodes (server nodes and slave nodes), other examples may comprise one or more further sets of intermediary nodes, e.g. between the master node 503*a* and server nodes 503*b*, and/or between the server nodes 503*b* and slave nodes 503*c*. As shown, each node is connected to one or more other nodes via a respective connection 602, and each end device 502 is connected to one or more slave nodes via a respective connection 602. One or more nodes (e.g. the master node) are referred to below as controlling nodes. Each controlling node is a node 503 that can instruct other nodes to perform an action through issuing commands.

The IoT network nodes 503 may correspond to hierarchies in scope of functionality, in superiority of instructions/prerogatives, and/or in span of access. In some implementations, a hierarchical set of SPV nodes implement an "IoT controller" with three levels of hierarchy, corresponding to the master 503*a*, server 503*b* and slave nodes 503*c* of FIGS. 5 and 6. The master node 503*a* instructs one or more server nodes 503*b*, and each server node instructs one or more slave nodes 503*c*. Each slave node 503*c* receives instructions from one or more server nodes 503*b*. Every slave node 503*c* communicates with one or more IoT end-devices 502, and these are the direct channels of communication between the IoT-controller 503 and the IoT end-devices 502. The states of execution of the IoT controller 503 are recorded in blockchain transactions Tx. Each IoT node—master, server, or slave—has the capacity to create and broadcast corresponding transactions Tx to the blockchain network 106. Each slave node monitors for trigger and/or confirmation signals from end-devices 502, and every IoT node 503 has the capacity to interact with any other IoT node with the purpose of executing the overall logic of the IoT controller.

The master node, server node(s) and slave node(s) can each independently connect to nodes 104 on the blockchain network 106, operate a blockchain wallet 105 (e.g. to watch blockchain addresses) and possibly run a full node (although this is not required). The master node 503*a* is configured to monitor the activity of other IoT nodes both directly and indirectly under their control, issue commands to these nodes in the form of blockchain transactions Tx and respond to alerts. The server node 503*b* is configured to watch multiple addresses, including addresses not directly controlled by the server node 503*b*. Server nodes 503*b* can be commanded to perform actions by a master node 503*a*. The slave node 503*c* is configured to monitor the activities of end devices 502 directly under their control. Slave nodes 503*c* are under the direct command of server nodes 503*b* and can also be commanded to perform actions by the master node 503*a*. The slave nodes 503*c* act as gateway nodes for the end devices 502 (i.e. a gateway between the end device and the blockchain network 106). The end device 502 is configured to connect to nearby slave devices. They report on end device state using off-chain messaging protocol.

Note that whilst a distinction is made between an IoT node 503 and an end device 502 in that end devices 502 are controlled by IoT nodes 503 but do not themselves control IoT nodes 503, an end device 502 may also be a node 104 of the blockchain network 106. That is, in some examples an end device 502 may operate a blockchain protocol client or wallet application 105.

The IoT network 501 strikes a balance between centralisation and decentralisation by combining a command and control hierarchy with use of a blockchain network infrastructure. Users of the network 501 may create their own multilevel control hierarchy which includes client-server as well as peer-to-peer relationships between devices. The network architecture comprises three layers: an IoT network 501, a blockchain P2P network 104 (i.e. full and lightweight blockchain clients, e.g. the master, servant and slave nodes are lightweight clients operating SPV wallets 105), and a blockchain mining network 504 (a subset of the blockchain P2P network that validates, propagates and stores the transactions propagated by the IoT nodes). The blockchain network 106 acts as backend infrastructure and there is an overlap between the IoT network 501 and the blockchain P2P network 106.

The first network (e.g. an IoT network) comprises one or more bridging nodes and one or more devices which can be controlled by one or more of the bridging nodes. The bridging nodes are also nodes of a blockchain network. That is, they are part of the IoT network and the blockchain network in the sense that they can connect both to the IoT network (e.g. to communicate with other network nodes and devices) and to the blockchain network (e.g. to transmit transactions to the blockchain and to identify and read from transactions recorded on the blockchain). These nodes act as a gateway or bridge between the first network and the blockchain network. They need not also have the roles of mining nodes, forwarding nodes or storage nodes of the blockchain network, though that is not excluded either. In some examples, one or more of the devices s of the first network may also be a node of the blockchain network.

One, some or all of the nodes 503 and devices 502 must be granted permission to join (i.e. access) the network 501. In the context of IoT, new nodes 503 are permitted onto the IoT network 501 using on-chain forgery resistant digital certificates provided by a registration authority (e.g. a trusted entity within the network). This solves problems associated with cyber-attacks by ensuring that only genuine nodes can access the network and/or control other nodes or devices within the network.

As stated above, permission to join the IoT network 501 is granted by a registration authority (the registration authority may also be referred to as a "permission granting authority" or a "certificate authority"). The registration authority is responsible for issuing digital certificates to requesting entities (e.g. a requesting node or a requesting device). An entity with a valid certificate has access to the IoT network 501. The registration authority comprises respective computer equipment, each comprising respective processing apparatus comprising one or more processors, e.g. one or more central processing units (CPUs), accelerator processors, application specific processors and/or field programmable gate arrays (FPGAs). The computing equipment of the registration authority also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

In order to grant permission for a requesting entity to join the network 501, the registration authority may generate a blockchain transaction Tx, referred to below as a "certificate transaction". An example certificate transaction is illustrated in FIG. 7*a*. The certificate transaction Tx comprises one or more inputs and one or more outputs. At least one input comprises a digital signature of the registration authority. That is, the registration authority has a first private key (e.g. a first private-public key pair) from which a digital signature can be generated, and the registration authority uses that digital signature to sign the transaction. An example certificate format is illustrated in FIG. 7*b*. By signing the certificate transaction, the registration authority attests to the data contained in the output(s) of the transaction. The digital signature can only be generated by the registration authority who has knowledge of the first private key. The transaction also has a first output (e.g. an unspendable output) which comprises a digital certificate issued by the registration authority to the requestor. The digital certificate includes an identifier assigned to the requestor. The identifier is unique to the requestor within the IoT network 501. The requestor is assigned an identifier which must remain fixed once issued and will appear in any certificates which the device is issued with. Preferably the device identifier is assigned at the time the certificate is generated. However, it is not excluded that the requestor already has a device identifier, which is then certified by way of inclusion in the certificate.

Once generated, the registration authority transmits the certificate transaction to one or more nodes 104 of the blockchain network 106 to be recorded in the blockchain 150. Once recorded in the blockchain 150, the requestor can use the certificate to prove to other nodes or devices of the network 501 that the requestor has been granted permission to join the network 501. For instance, when communicating with other nodes 503 of the network 501, the requestor can include information identifying the certificate transaction and thus the certificate.

Referring to FIGS. 1 to 3, in these examples the first node may be the computer equipment 102*a* of Alice 103*a* and the second node may be the computer equipment 102*b* of Bob 103*b*.

If the requestor is a node 503 of the network 501 (or is requesting permission to join the network 501 as a node), the certificate may comprise a unique public key assigned to that node. The public key allows the requesting node 503, once they have joined the network 501, to transmit and receive blockchain transactions.

The certificate transaction may comprise a second output which is locked to a second public key of the registration authority. The second public key may be the same as the public key used to generate the signature that signs the certificate transaction, or it may be a different public key. The second output is locked to the second public key in the sense that the knowledge of the second public key is required to unlock the output. For instance, the second output may comprise a hash of the second public key, and in order to be unlocked by an input of a later transaction, that input must comprise the second public key. When the second output is executed alongside an input of the second transaction, the second public key provided in the input is hashed and compared with the hash contained in the second output. If the two hashes match, the second output 1502*b* may be unlocked (provided any additional constraints have been met).

An output may be locked to a public key via a pay-to-public-key-hash (P2PKH). A P2PKH is a script pattern that locks an output to a public key hash. P2PKH outputs can be spent if a recipient provides a signature valid against a public key matching the public key hash. That is, a P2PKH output challenges the spender to provide two items: a public key such that the hash of the public key matches the address in the P2PKH output, and a signature that is valid for the public key and the transaction message, not necessarily in that order.

As the second output 1502*b* is locked to a public key of the registration authority, only the registration authority can revoke the certificate. This prevents the certificate being revoked from a malicious party.

Each transaction, when recorded in the blockchain 150, can be identified by a unique transaction identifier TxID. A transaction identifier may be generated by computing the (double) SHA256 hash of the serialised transaction bytes. Other hash functions may be used instead of SHA256. The registration authority may transmit a transaction identifier of the certificate transaction to the requestor. This allows the requestor to identify the certificate transaction and therefore obtain the certificate within the certificate transaction. Alternatively, the requestor may listen for transactions transmitted to the blockchain 150 from the address of the registration authority.

If the requestor is joining the network 501 as a node (e.g. a servant node), the requesting node may use the transaction identifier to obtain the first public key of the registration authority and identify one or more further transactions (i.e. further certificate transactions) sent from that first public key. The further transactions may each comprise a respective certificate of one or more further nodes or devices of the network 501. The requestor may then obtain (e.g. download and save) those certificates. The information within the certificates (e.g. device identifier and/or public key) may be used to communicate with other nodes 503 and/or devices 502 of the network 501. For example, the requestor may transmit a blockchain transaction to another node 503 using that node's certified public key, e.g. by including an output in the transaction locked to the certified public key (e.g. a P2PKH output). When receiving a command, the requestor can use the certificates to check whether the command has been issued from a permissioned node 503 or device 502.

If the requestor is joining the network 501 as an end device 502 that cannot access the blockchain, the registration authority may transmit the certificate to the end device, e.g. over a wired connection or a wireless connection such as, for instance, Bluetooth, Wi-Fi, etc. The registration authority may also transmit a set of one or more second certificates to the requesting end device 502. These second certificates, each issued to a respective node or end device of the network 501, can be used to ensure that the requesting end device's communication is to and from permissioned nodes 503 and devices 502.

Each certificate (first and second) may comprise a network address (e.g. an IP address) of the node 503 or end device 502 to which the certificate is issued. The requestor can use the network address of a permissioned (i.e. certified) node to communicate with that node, e.g. to send a sensor reading or command acknowledgement.

The registration authority may transmit the certificate issued to the requestor and to one or more nodes and/or end devices of the network 501. Those end devices may use the certificate to communicate with the requestor and to verify whether the requestor has been granted permission to join the network 501.

Revoking Network Access

Figure 8:
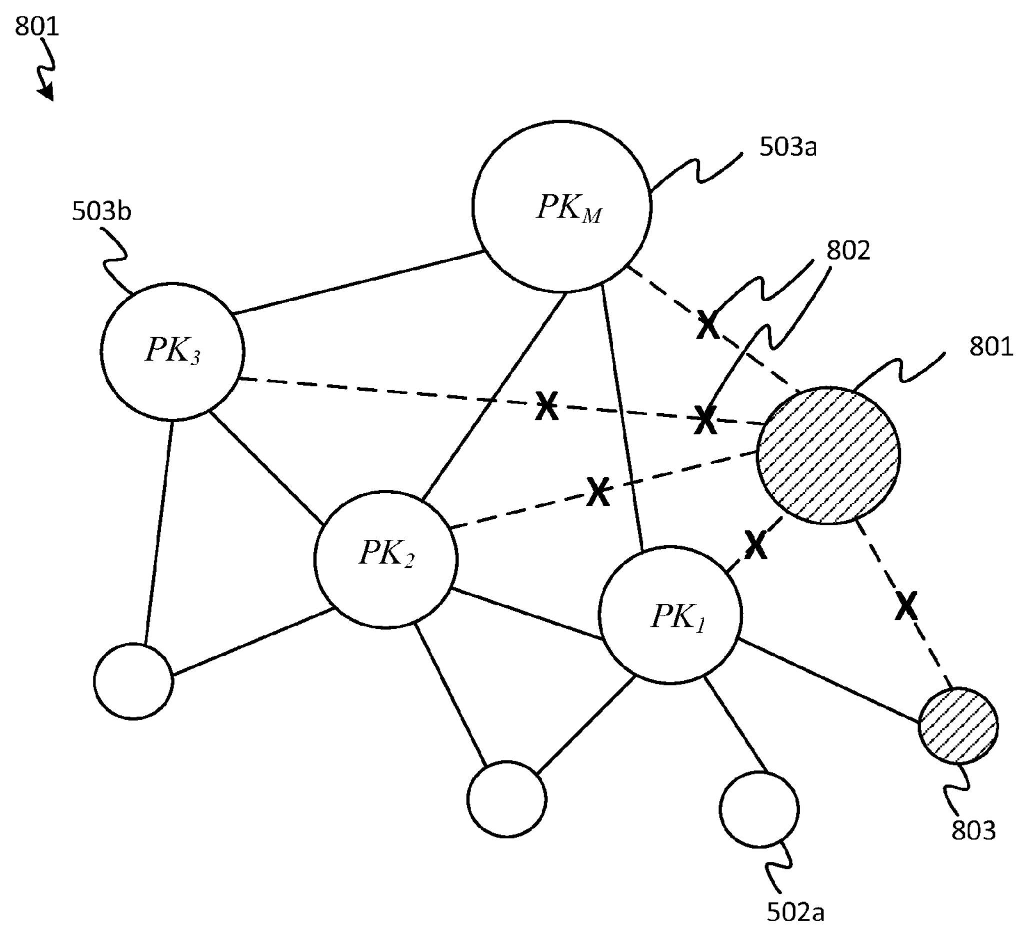
FIG. 8 schematically illustrates an example network wherein a node is failing to connect and/or respond to other nodes and devices on the network.

In some instances, a certificate issued to a requestor may need to be revoked. For example, the requestor may have been compromised, or may have developed a fault. FIG. 8 illustrates an example network 801 in which a faulty or malicious node 801 is failing to connect or respond to other nodes 503*a*, 503*b* and devices 803 on the network. For the sake of brevity, a faulty or malicious node 801 will be referred to as a faulty node from now on.

Furthermore, any reference to "a faulty node 801" may be taken to mean "a faulty node or a faulty end device" unless the context requires otherwise. This particular example network 801 comprises a master node 503*a*, several intermediate nodes 503*b* (one of which happens to be the faulty node 801) and several end devices 502*a*. The faulty node 801 is shown as shaded. An end device 803 controllable by the faulty node 801 is also shown as shaded. The end device 803 is an interrupted end device 803 in the sense that due to the faulty node 801 experiencing connection issues, the interrupted node 803 can no longer be controlled by the faulty node 801. If, like in the example of FIG. 8, the interrupted end device 803 is only controllable by the faulty node 801, the interrupted end device 803 can no longer be controlled, since no other nodes 503*a*, 503*b* can establish a connection with the interrupted end device 803. The solid lines between nodes and devices in FIG. 8 represent established connections, whereas the broken lines between the faulty node 801 and other nodes 503*a*, 503*b* and the interrupted node 803 represent failed connections 802.

In the example of FIG. 8, each node that experiences a connection problem with the faulty node 801 is associated with a respective public key. A first node has a first public key $PK_1$, a second node has a second public key $PK_2$, a third node has a third public key $PK_3$, and a master node has a master public key $PK_M$.

When a node (e.g. an intermediate node 503) fails to connect with a faulty node 801, the node 503*b* may generate an alert transaction. The purpose of the alert transaction is to alert the registration authority 503*a* (e.g. the master node 503*a*) to the possibility that a node on the network has become faulty or compromised. Note that the term "faulty node" 801 is also used herein to refer to a node which is suspected of being a faulty or compromised node, and need not necessarily actually be a faulty or compromised node.

FIG. 9*a* illustrates an example of an alert transaction generated by the first node. The alert transaction comprises a first output that comprises an alert message (or alert data). In this example, the output comprising the alert message is an unspendable output (e.g. an "OP_RETURN output"). Note that according to some blockchain protocols, an output is made unspendable by the opcodes "OP_FALSE OP_RETURN". Reference throughout the present application to an "OP_RETURN output" is taken to be equivalent to an "OP_FALSE OP_RETURN output". In other examples, the output comprising the alert message may be a spendable output. The alert message comprises data identifying the faulty node 801.

FIG. 10 illustrates an example alert message. The data identifying the faulty node 801 may comprise a device identifier ("Device ID") of the faulty node (or faulty device as the case may be). For faulty nodes, the alert message may comprise a public key of the faulty node 801, e.g. the certified public key used by the faulty node 801 to access the network 501. In the example of FIG. 10, the faulty node 801 has public key $PK_4$. The alert message may comprise data ("Device certificate location data") identifying the location of the faulty node's certificate that certifies the device or node, e.g. the node's public key. In examples in which the first node has identified more than one faulty node 801, the alert message may comprise respective data identifying each faulty node 801. Alternatively, the first node may comprise multiple alert messages, each identifying a respective faulty node 801. As another alternative option, the first node may generate multiple alert transactions, each comprising an alert message identifying a respective faulty node 801.

In some examples, the alert message may comprise data representing a number of failed connections between the first node and the faulty node 801. In examples where the alert message identifies multiple faulty nodes 801, the alert message may comprise respective data representing a respective number of failed connections between the first node and the respective faulty node 801.

The alert transaction also comprise a second output associated with the registration authority 503*a*. In the example of FIGS. 9*a-c* and FIGS. 10 to 12, the registration authority 503*a* comprises the master node having the master public key $PK_M$. However, it will be appreciated that the registration authority 503*a* may be distinct from the master node. The output associated with the registration authority 503*a* may be an output locked to an address based on the public key $PK_M$ of the registration authority 503*a*, e.g. a pay-to-public-key-hash output payable to a hash of the public key $PK_M$ of the registration authority 503*a*.

The alert transaction also includes an input comprising a signature $Sig_{PK1}$ of the first node. For instance, the first node may sign the first and second outputs of the transaction using a signature $Sig_{PK1}$ based on a private key corresponding to the first node's public key $PK_1$. In these examples, a flag (referred to as a "sighash flag") is included in the input that enables other inputs to be added to the alert transaction. In this particular example, the flag "SIGHASH_ANYONECANPAY" is a signature hash type which signs only the current input, i.e. the input comprising the first node's signature $Sig_{PK1}$.

The first node may transmit the alert transaction to the registration authority 503*a*, e.g. to alert the registration authority 503*a* of the faulty node 801. Additionally or alternatively, the first node may transmit the alert transaction to the blockchain network 106 to be recorded in the blockchain 150, thus alerting the registration authority 503*a*. For instance, the registration authority 503*a* may be configured to monitor the blockchain 150 for transaction outputs payable to the address based on the public key $PK_M$ of the registration authority 503*a*, e.g. $H_{160}(PK_M)$. In other embodiments, the first node may forward the alert transaction to the second node (note that in the specific examples shown in FIGS. 9*a-c* and FIGS. 10 to 12, this is actually necessary since the input values are less than the output values and so the transaction would be rejected by the blockchain network 106). For example, the registration authority 503*a* may operate a protocol which requires the alert transaction to be signed by multiple nodes. In this sense, the alert transaction may be referred to as a "partial alert transaction". In some examples, a partial transaction is a transaction that requires at least one additional input for it to be accepted by the blockchain network 106 as a valid transaction.

The second node, upon receiving the alert transaction from the first node (or upon otherwise obtaining the alert transaction), may attempt to establish a connection with the faulty node 801, i.e. the node identified as being faulty by the alert transaction. If the second node is unable to connect to the fault node 801, the second nodes adds another input to the alert transaction. Like the input added by the first node, the input added by the second node includes a signature $Sig_{PK2}$ the second node. The signature $Sig_{PK2}$ the second node may sign the whole transaction (i.e. all inputs and outputs), or a part of the transaction, e.g. only the input added by the second node, or the input added by the second node and one or more outputs. The second node may transmit the alert transaction to one, some or all of the registration authority 503*a*, the blockchain network 106, and/or a third node. For example, if only two signatures are required in the alert transaction in order for the registration authority 503*a* to act on the alert message, the second node may transmit the alert transaction to the registration authority 503*a* and/or to the blockchain network 106. If a third signature is required, the second node may send the alert transaction to the third node. The second node may include a flag in the input that enables other inputs to be added to the alert transaction.

Like the second node, the third node may attempt to establish a connection with the faulty node 801 in response to receiving the alert transaction from the second node. If the third node cannot establish a connection with the faulty node 801, e.g. the faulty node 801 does not respond to commands or requests from the third node, the third node may add an input to the alert transaction. That is, the third node adds an input that includes a signature $Sig_{PK3}$ of the third node. If enough signatures have been included in the alert transaction, the third node may include a flag that signs the whole transaction, e.g. a "SIGHASH_ALL" flag. The third node may then transmit the (complete) alert transaction to the registration authority 503*a* and/or to the blockchain network 106.

The second and/or third node may each add, to the alert transaction, data representing a number of failed connections (or attempts at connections) between the second or third node and the faulty node 801. The data may be added to their respective inputs of the alert transaction, or to a (spendable or unspendable) output of the alert transaction.

The registration authority 503*a*, which in the example of FIGS. 9*a* to 12 is the master node of the network, obtains the alert transaction. The registration authority 503*a* may obtain the alert transaction directly from the first, second or third node, depending on which node is responsible for transmitting the alert transaction to the registration authority 503*a*. The registration authority 503*a* may obtain the alert transaction from the blockchain 150 if the alert transaction has been transmitted to the blockchain network 106. Note that obtaining from the blockchain 150 also includes obtaining from a memory pool of transactions of a node 104M of the blockchain network 106. Preferably, the alert transaction comprises an output that is locked based on the registration authority's public key $PK_M$, e.g. a P2PKH output locked to an address based on the registration authority's public key $PK_M$.

Once the registration authority 503*a* has obtained the alert transaction, the certificate of the faulty node 801 identified in the alert message of the alert transaction may be revoked. Revocation of the faulty node's certificate may be initiated automatically in response to obtaining the alert transaction. That is, no other conditions are required to be met in order for the registration authority 503*a* to revoke the faulty node's certificate. Alternatively, the registration authority 503*a* may determine whether one or more conditions have been met, and if so, then it may revoke the faulty node's certificate.

In some embodiments, before revoking the faulty node's certificate, the registration authority 503*a* may itself attempt to establish a connection with the faulty node 801. If a connection cannot be established, the registration authority 503*a* may then revoke the certificate. In other words, a condition for revoking the certificate may be that the registration authority 503*a* cannot connect to the faulty node 801. In this way, the alert transaction acts as a prompt for the registration authority 503*a* to investigate whether there is indeed a problem with the faulty node 801.

Additionally or alternatively, a condition for revoking the certificate of the faulty node 801 is that the alert transaction comprises a predetermined number of signatures from nodes of the network 501. That is, the number of signatures in the alert transaction must meet a threshold in order for the registration authority 503*a* to revoke the certificate. In the examples of FIG. 9*a-c*, the threshold is three signatures. In this way, the registration authority 503*a* can be confident that it is not just an isolated node that is experiencing problems with the faulty node 801, rather it is several nodes who are each experiencing problems with the faulty node 801.

Additionally or alternatively, a condition for revoking the certificate of the faulty node 801 is that the alert transaction comprises data indicating that a threshold number of failed connections have occurred between one or more of the first, second and third nodes and the faulty node 801. In examples where more than one of the nodes reports a respective number of failed connections with the faulty node 801, the registration authority 503*a* may take only individual node's failed connections into account when determining if the threshold has been met. That is, if the threshold is ten failed connections and each node reports less than ten failed connections, the registration authority 503*a* may choose not to revoke the certificate. In contrast, the registration authority 503*a* may take the cumulative number of failed connections of all of the nodes into account when deciding whether or not to revoke the certificate. That is, if the threshold is ten failed connections and each node reports five failed connections, the registration authority 503*a* may choose to revoke the certificate.

FIG. 11*a* illustrates another example of an alert transaction generated by the first node. In this example, in response to experiencing connection problems with the faulty node 801, the first node generates an alert transaction that comprise a first output which includes the alert message (as described above), and a second output which takes the form of a multi-signature output. The multi-signature ("multi-sig") output of FIG. 11*a* is an output (e.g. an output script) that provides n number of public keys and is configured to, in order to be unlocked, require an input (e.g. an input script) of a later transaction to provide m minimum number of signatures corresponding to the provided public keys. One or more of the n public keys may correspond to public keys of nodes of the network 501, e.g. the public key of the second node $PK_2$ and the public key of the third node $PK_3$. The public key of the first node $PK_1$ may also be included in the multi-sig output. In some examples, the public key $PK_M$ of the registration authority 503*a* may be included in the multi-sig output.

The alert transaction comprises an input that includes a signature $Sig_{PK1}$ of the first node. The signature $Sig_{PK1}$ of the first node may sign the entire alert transaction. In those examples, the first node may transmit the alert transaction to the blockchain network 106 for inclusion in the network. Additionally or alternatively, the first node may transmit the alert transaction to the registration authority 503*a*.

As mentioned, the multi-sig output requires m signatures to be included in an input of a later transaction that references the multi-sig output in order to unlock that output. FIG. 11*b* illustrates a second alert transaction (or rather a confirmation transaction) that may be generated by one or more of the nodes whose public key is included in the multi-sig output. The confirmation transaction may comprise the same alert message as the alert transaction. The confirmation transaction comprises an input that includes at least m signatures, and is then transmitted to the blockchain network for inclusion in the blockchain 150. As an example, a confirmation transaction comprising an input that includes the second signature $Sig_{PK2}$ and the third signature $Sig_{PK3}$ (as shown in FIG. 11*b*) would unlock the multi-sig output of FIG. 11*a*. The confirmation transaction acts as confirmation by the nodes, whose signatures are included in its inputs, that they confirm that they too are experiencing connection problems with the faulty node 801. The confirmation transaction may comprise an output locked to an address of the registration authority 503*a*, e.g. a P2PKH output payable to a hash of the public key $PK_M$ of the registration authority 503*a*. This would alert the registration authority 503*a* to the alert message contained in the alert transaction, thus allowing the registration authority 503*a* to then revoke the certificate of the faulty node 801 (e.g. if the one or more conditions described above have been met).

FIG. 12*a* illustrates another example of an alert transaction generated by the first node. In this example, in response to experiencing connection problems with the faulty node 801, the first node generates an alert transaction that comprise a first output which includes the alert message (as described above), and a second output which takes the form of a different type of multi-signature output. The multi-signature output of FIG. 12*a* is an output (e.g. an output script) that provides n number of public key hashes (i.e. a hash of a public key) and is configured to, in order to be unlocked, require an input (e.g. an input script) of a later transaction to provide m minimum number of signatures corresponding to the provided public keys. The multi-sig output of FIG. 12*a* is also referred to as a "multi-sig accumulator", as described in GB 1913385.9. The multi-sig accumulator is configured to increase a counter each time a signature is provided (i.e. when the input of a later transaction is executed alongside the multi-sig accumulator) that corresponds to a public key hash included in the multi-sig accumulator. If a threshold number (set by the multi-sig accumulator) of signatures have been provided, the multi-sig accumulator output is unlocked. One or more of the n public key hashes may be hashes of public keys corresponding to public keys of nodes of the network 501, e.g. one, some or all of: the public key $PK_1$ of the first node, the public key $PK_2$ of the second node, the public key $PK_3$ of the third node, and/or the public key $PK_M$ of the registration authority 503*a*.

The alert transaction comprises an input that includes a signature $Sig_{PK1}$ of the first node. The signature $Sig_{PK1}$ of the first node may sign the entire alert transaction. In those examples, the first node may transmit the alert transaction to the blockchain network 106 for inclusion in the network.

As mentioned, the multi-sig accumulator output requires m signatures to be included in an input of a later transaction that references the multi-sig output in order to unlock that output. FIG. 12*b* illustrates a second alert transaction (or rather a confirmation transaction) that may be generated by one or more of the nodes whose public key hash is included in the multi-sig accumulator output. The confirmation transaction may comprise the same alert message as the alert transaction. The confirmation transaction comprises an input that includes at least m signatures, and is then transmitted to the blockchain network 106 for inclusion in the blockchain 150. As an example, a confirmation transaction comprising an input comprising the second public key $PK_2$ and corresponding second signature $Sig_{PK2}$, and the third public key $PK_3$ and corresponding third signature $Sig_{PK3}$ (as shown in FIG. 12) would unlock the multi-sig accumulator output of FIG. 12*a*. The confirmation transaction may comprise an output locked to an address of the registration authority 503*a*, e.g. a P2PKH output payable to a hash of the public key $PK_M$ of the registration authority 503*a*. This would alert the registration authority 503*a* to the alert message contained in the alert transaction, thus allowing the registration authority 503*a* to then revoke the certificate of the faulty node 801 (e.g. if the one or more conditions described above have been met).

In some examples, the certificate of the faulty node 801 is contained in an output of a certificate transaction recorded on the blockchain 150. In order to revoke the certificate, the registration authority 503*a* generates a blockchain transaction (a "revoke transaction"). The revoke transaction has an input that references a spendable output of the certificate transaction (e.g. the output locked to the public key $PK_M$ of the registration authority 503*a*, as shown in FIG. 7*a*). The input comprises a signature linked to that public key. If the spendable output of the certificate transaction is a P2PKH output, the input of the revoke transaction must comprise a public key such that the hash (e.g. OP_HASH160) of the public key matches the public key hash in the P2PKH output. A P2PKH output challenges the spender to provide two items: a public key such that the hash of the public key matches the address in the P2PKH output, and a signature that is valid for the public key and the transaction message, not necessarily in that order.

The revoke transaction may comprise one or more outputs, e.g. an output locked to the same or a different public key of the registration authority 503*a*. The registration authority 503*a* then transmits the revoke transaction to the blockchain network 106 to be recorded on the blockchain 150. Once the revoke transaction is recorded on the blockchain 150, the certificate transaction will be removed from the unspent transaction output (UTXO) set. A UTXO is an output from a blockchain transaction that has not been spent by another blockchain transaction. When a different node on the network 501 attempts to identify a certificate issued to the faulty node 801, that node will find that the certificate transaction comprising the certificate has been spent, and interpret this as the certificate being revoked. Nodes of the network 501 are able to dynamically update their peer-list (i.e. a list of permissioned/certified nodes) by watching the transactions generated from and to the issuing address (i.e. the public key $PK_M$ of the registration authority 503*a*). Nodes on the network 501 are configured not to communicate with other nodes who do not appear of the peer-list.

The validity of a node/device certificate may depend on three criteria: the public key $PK_M$ that issues the certificate is the recognised issuing key, the certificate is correctly formatted according to a predetermined protocol, and the spendable output in the certificate transaction is unspent. Certificates can be updated once they have been revoked, if required. To do so, the registration authority 503*a* spends the UTXO in the old certificate then creates a new certificate transaction with updated information. The registration authority 503*a* can then broadcast the new certificate outpoint location index to the devices on the network 501. This also applies to the registration authority's own (self-signed) certificate.

Embodiments have been described in relation to a single faulty node 801 and/or a single faulty device. However, it will be appreciated that the above embodiments can be generalised to one or more faulty nodes and/or one or more faulty devices. For instance, the alert message may comprise respective data identifying each of the one or more faulty nodes and/or devices. Similarly, the registration authority 503*a* may revoke respective certificates of the one or more faulty nodes and/or devices.

In summary, the present invention provides a solution which enables peers in a (IoT) network to securely alert a registration authority 503*a* to a suspected faulty or malicious node, e.g. by reporting the number of failed connections with an end device and/or a peer node. A multi-party computation may be used to create a shared message, signalling that multiple independent nodes are raising an alert. By using blockchain transactions to encode the message, several beneficial features of the blockchain system are inherited. The first is that the authenticity of the alert message is guaranteed through public key cryptography. The second is that, by setting an adjustable minimum payment requirement for alert transaction messages to be acted on, the incentive to spam the network with false alerts is reduced. Thirdly, a threshold number of signatures (in analogy to a petition) beyond which the registration authority 503*a* is alerted of a connection issue may be set.

A specialised transaction (the alert transaction) acts as an alert message to the registration authority 503*a* (e.g. the master node). In a first set of embodiments, the solution makes use of signature hash types, which allow several parties to agree on and sign a single transaction. In a second set of embodiments, the solution makes use of multi-signature outputs which provides the same functionality as the first set of embodiments. In general, a registration authority 503*a* can select a minimum number of independent signatures required to respond to the alert transaction, e.g. to revoke the certificate. In the following examples, the minimum number of signatures required is set as three.

Specific Example:

An IoT network comprises a master node, four servant peer nodes and several end devices. One of the nodes (shown as striped in FIG. 8) is failing to connect with one or more of the other nodes and an end device. To initiate the alert process, a peer creates an alert transaction (FIG. 9*a*). The transaction contains an OP_RETURN payload encoding the alert message (see FIG. 10) specifying the device ID, public key and certificate location of the faulty device. It also contains a payment to the master node of 3x, the minimum payment required for a master node to investigate. The transaction is funded with x+δ signed by the node controlling $PK_1$ using a SIGHASH_ANYONECANPAY sighash type. Note the transaction is not a valid transaction at this point. The partially complete transaction is sent (peer-to-peer) to the node controlling $PK_2$. If the node also experiences a failed connection/unexpected behaviour from the faulty node 801, it too adds a signature to a second input of x signed by the node controlling $PK_2$ using a SIGHASH_ANYONECANPAY sighash type (see FIG. 9*b*). The transaction is still not a valid transaction at this point. The partially complete transaction is sent (peer-to-peer) to the node controlling $PK_3$. If the node also experiences a failed connection/unexpected behaviour from the faulty node 801, it too adds a signature to a third input of x signed by the node controlling $PK_3$ using a SIGHASH_ALL sighash type (see FIG. 9*c*). The transaction is now complete and can be sent to both the master node and the blockchain network 106 to be confirmed. Once the transaction is confirmed and the master node has received a confirmed signal it can investigate the failure by attempting to communicate with the faulty node 801.

Note that the second and third nodes cannot alter the alert message specified by the first node. If the second and third nodes therefore wish to report the exact number of failed connections they have experienced with the potentially faulty/malicious node, then they can do this by pushing an op_code in their respective outputs (FIGS. 9*b* and 9*c*) i.e. OP_2 OP_DROP for 2 failed connections.

For the master node to consider responding to the alert, the transaction containing the message must have three signatures, demonstrating that a threshold number of peers support the alert message. The master node may then investigate the issue and consider certificate revocation. The payload data of the alert message contains the IoT protocol identifier along with the target device ID and certificate information. Fail count information is contained in the alert message field within the OP_RETURN payload of the transaction.

An alternative option is to make use of a pay to multi-signature or a multi-sig accumulator. FIG. 11*a* shows a pay to multi-signature transaction output where 2 of n public keys (nodes) are required to spend the transaction (and thus alert the master node). FIG. 11*b* shows the unlocking of the initial alert transaction (i.e., the condition of at least 2 nodes agreeing that the alert message has been met) and a payment to initiate the certificate revocation is sent to the master node who verifies the chain of transactions and initial alert message in FIG. 11*a*. An example of the multi-sig accumulator transaction is shown in FIG. 12*a*. Here, the first node has created the transaction and alert message. The second output stipulates that at least two additional signatures must be collected for the transaction to be spent (and thus alert the master node). As before, a second transaction (FIG. 12*b*) spends the outpoint from the first alert transaction indicating that there is consensus on the message defined in FIG. 12*a* and sends payment to the master node to initiate the certificate revocation process. Note that in these two examples, the funds could be encumbered to an alert address that is used only when an alert message is created.

Conclusion

It will be appreciated that the above embodiments have been described by way of example only. More generally there may be provided a method, apparatus or program in accordance with any one or more of the following Statements.

Statement 1. A computer-implemented method for revoking access to a first network, wherein the first network comprises a set of bridging nodes and a set of devices controllable by one or more of the set of bridging nodes, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a registration authority and comprising: obtaining an alert transaction, the alert transaction being a blockchain transaction and comprising a first output, the first output comprising an alert message identifying one or more bridging nodes and/or one or more devices; and revoking access to the first network by the identified one or more bridging nodes and/or one or more devices by revoking the respective certificate of the identified one or more bridging nodes and/or one or more devices, wherein revoking the respective certificate comprises spending an output from the respective certificate transaction.

That is, the revoking of the access to the first network is based on at least said obtaining of the alert transaction.

Statement 2. The method of statement 1, wherein the respective certificate of each bridging node comprises a respective public key associated with that bridging node.

Statement 3. The method of any of statements 1 to 2, wherein said obtaining of the alert transaction comprises obtaining the alert transaction from the blockchain.

In other words, the alert transaction is obtained from the blockchain transaction.

Statement 4. The method of any of statements 1 to 3, wherein said obtaining of the alert transaction comprises obtaining the alert transaction from one of the bridging nodes.

In other words, the alert transaction is sent peer-to-peer.

Statement 5. The method of any of statements 1 to 4, comprising:

- in response to obtaining the alert transaction, attempting to establish a respective connection with the identified one or more nodes and/or one or more devices; and
- said revoking comprises revoking access to the first network by the identified one or more bridging nodes and/or one or more devices for which the respective connection cannot be established.

That is, the alert transaction initiates the investigation (e.g. by the master node) into whether a certificate should be revoked.

Statement 6. The method of any of statements 1 to 5, wherein the alert message comprises, for each of the identified one or more bridging nodes and/or one or more devices, a respective number of failed attempted connections between one or more bridging nodes and the identified bridging node or device; and wherein said revoking comprises revoking access to the first network by the identified one or more bridging nodes and/or one or more devices for which the respective number of failed attempted connections is greater than or equal to a predetermined threshold number of failed attempted connections.

Statement 7. The method of any of statements 1 to 6, wherein the alert transaction comprises a respective digital signature of one or more of the bridging nodes.

Statement 8. The method of statement 7, wherein the alert transaction comprises one or more inputs, each input comprising the respective digital signature of one of the one or more bridging nodes.

Statement 9. The method of statement 7, wherein the alert transaction comprises one or more inputs, and wherein at least one input comprises the respective digital signature of multiple ones of the one or more bridging nodes.

Statement 10. The method of any of statements 7 to 9, wherein revoking is conditional on the alert transaction comprising a number of respective digital signatures of the one or more of the bridging nodes that is greater than or equal to a predetermined threshold number of digital signatures.

Statement 11. The method of any preceding statement, wherein the alert message comprises, for each identified bridging node, one or more of the following:

- a respective identifier of the identified bridging node;
- a respective public key of the identified bridging node; and
- a respective location of the respective certificate of the identified bridging node.

Statement 12. The method of any preceding statement, wherein the alert message comprises, for each identified device, one or more of the following:

- a respective identifier of the identified device; and
- a respective location of the respective certificate of the identified device.

Statement 13. The method of any preceding statement, wherein the first network comprises a master layer comprising a master node, one or more intermediary layers each comprising a respective plurality of the bridging nodes, and a device layer comprising the one or more devices; and wherein the registration authority comprises the master node.

Statement 14. A computer-implemented method for reporting a failed connection to a registration authority responsible for revoking access to a first network, wherein the first network comprises a set of bridging nodes and a set of devices controllable by one or more of the set of bridging nodes, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a first one of the bridging nodes and comprising: in response to a predetermined number of failed attempts at establishing a respective connection with one or more bridging nodes and/or one or more end devices, adding a digital signature of the first bridging node to an input of a first alert transaction, the first alert transaction being a blockchain transaction and comprising a first output, the first output comprising an alert message identifying the one or more bridging nodes and/or the one or more devices; and transmitting the first alert transaction to one, some or all of: a different one of the bridging nodes, the registration authority, and one or more nodes of the blockchain network for inclusion in the blockchain.

Statement 15. The method of statement 14, comprising, in response to the predetermined number of failed attempts at establishing the respective connection with the one or more bridging nodes and/or the one or more end devices, generating the first alert transaction, wherein said generating of the first alert transaction comprises adding the digital signature of the first bridging node to the alert transaction.

Statement 16. The method of statement 14, comprising, obtaining the first alert transaction from a second one of the bridging nodes and/or the blockchain.

Statement 17. The method of statement 16, wherein the obtained first alert transaction comprises a respective digital signature of the second one of the bridging nodes.

Statement 18. The method of statement 17, wherein the obtained first alert transaction comprises a respective digital signature of one or more further ones of the bridging node.

Statement 19. The method of any of statements 14 to 18, wherein the registration authority is associated with a public key, and wherein the first alert transaction comprises an output payable to an address based on the public key of the registration authority.

Statement 20. The method of any of statements 14 to 19, wherein the first alert transaction comprises a multi-signature output, the multi-signature output comprises a plurality of respective public keys, each public key associated with a respective one of the bridging nodes, and wherein the multi-signature output is configured to, when executed alongside an input of a spending transaction, unlock on condition that the input comprises a predetermined number of respective signatures corresponding to the plurality of respective public keys.

Statement 21. The method of any of statements 14 to 19, wherein the first alert transaction comprises a multi-signature output, the multi-signature output comprises a plurality of respective addresses, each address associated with a respective one of the bridging nodes, and wherein the multi-signature output is configured to, when executed alongside an input of a spending transaction, unlock on condition that the input comprises a predetermined number of respective signatures corresponding to the plurality of respective addresses.

Statement 22. The method of any of statements 14 to 19, wherein the blockchain comprises a second alert transaction, wherein the second alert transaction comprises a multi-signature output, the multi-signature output comprising a plurality of respective public keys, each public key being associated with a respective one of the bridging nodes, and wherein the multi-signature output is configured to, when executed alongside an input of a spending transaction, unlock on condition that the input comprises a predetermined number of respective signatures corresponding to the plurality of respective public keys, and wherein the input of the first alert transaction spends the multi-signature output of the second alert transaction.

Statement 23. The method of any of statements 14 to 19, wherein the blockchain comprises a second alert transaction, wherein the second alert transaction comprises a multi-signature output, the multi-signature output comprising a plurality of respective addresses, each address being associated with a respective one of the bridging nodes, and wherein the multi-signature output is configured to, when executed alongside an input of a spending transaction, unlock on condition that the input comprises a predetermined number of respective signatures corresponding to the plurality of respective addresses, and wherein the input of the first alert transaction spends the multi-signature output of the second alert transaction.

Statement 14. The method of any of statements 14 to 23, wherein the alert message comprises, for each of the identified one or more bridging nodes and/or one or more devices, a respective number of failed attempted connections between the first bridging node and the identified bridging node or device.

Statement 25. The method of any of statements 14 to 24, wherein the alert message comprises, for each identified bridging node, one or more of the following:

a respective identifier of the identified bridging node;

a respective public key of the identified bridging node; and a respective location of the respective certificate of the identified bridging node.

Statement 26. The method of any of statements 14 to 25, wherein the alert message comprises, for each identified device, one or more of the following:

a respective identifier of the identified device; and a respective location of the respective certificate of the identified device.

Statement 27. The method of any of statements 14 to 26, wherein the first network comprises a master layer comprising a master node, one or more intermediary layers each comprising a respective plurality of the bridging nodes, and a device layer comprising the one or more devices; and wherein the first bridging node is a bridging node of one of the one or more intermediary layers.

Statement 28. The method of statement 27, wherein the registration authority comprises the master node.

Statement 29. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 28.

Statement 30. A computer program embodied on computer-readable storage and configured so as, when run on computer equipment, to perform the method of any of statements 1 to 28.

Other variants or use cases of the disclosed techniques may become apparent to the person skilled in the art once given the disclosure herein. The scope of the disclosure is not limited by the described embodiments but only by the accompanying statements.

The invention claimed is:

1. A computer-implemented method for revoking access to a first network, wherein the first network is an Internet of Things (IoT) network, wherein the first network comprises a set of bridging nodes and a set of devices controllable by one or more of the set of bridging nodes, wherein the set of devices is a set of IoT end devices of the IoT network, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a registration authority and comprising:

obtaining an alert transaction, the alert transaction being a blockchain transaction and comprising a first output, the first output comprising an alert message identifying one or more bridging nodes and/or one or more devices, wherein the alert message comprises, for each of the identified one or more bridging nodes and/or one or more devices, a respective number of failed attempted connections between one or more bridging nodes and the identified bridging node or device, wherein the one or more devices are each IoT end devices of the IoT network; and revoking access to the first network that is the IoT network by the identified one or more bridging nodes and/or one or more devices by revoking the respective certificate of the identified one or more bridging nodes and/or one or more devices, wherein revoking the respective certificate comprises spending an output from the respective certificate transaction, wherein said revoking comprises revoking access to the first network by the identified one or more bridging nodes and/or one or more devices for which the respective number of failed attempted connections is greater than or equal to a predetermined threshold number of failed attempted connections.

2. The method of claim 1, wherein the respective certificate of each bridging node comprises a respective public key associated with that bridging node.

3. The method of claim 1, wherein said obtaining of the alert transaction comprises obtaining the alert transaction from the blockchain and/or obtaining the alert transaction from one of the bridging nodes.

4. The method of claim 1, comprising:

in response to obtaining the alert transaction, attempting to establish a respective connection with the identified one or more nodes and/or one or more devices; and said revoking comprises revoking access to the first network by the identified one or more bridging nodes and/or one or more devices for which the respective connection cannot be established.

5. The method of claim 1, wherein the alert transaction comprises a respective digital signature of one or more of the bridging nodes.

6. The method of claim 5, wherein revoking is conditional on the alert transaction comprising a number of respective digital signatures of the one or more of the bridging nodes that is greater than or equal to a predetermined threshold number of digital signatures.

7. The method of claim 1, wherein the alert message comprises, for each identified bridging node:

a respective identifier of the identified bridging node;

a respective public key of the identified bridging node; and a respective location of the respective certificate of the identified bridging node.

8. The method of claim 1, wherein the alert message comprises, for each identified device:

a respective identifier of the identified device; and a respective location of the respective certificate of the identified device.

9. The method of claim 1, wherein the first network comprises a master layer comprising a master node, one or more intermediary layers each comprising a respective plurality of the bridging nodes, and a device layer comprising the one or more devices; and wherein the registration authority comprises the master node.

10. A computer-implemented method for reporting a failed connection to a registration authority responsible for revoking access to a first network, wherein the first network is an Internet of Things (IoT) network, wherein the first network comprises a set of bridging nodes and a set of devices controllable by one or more of the set of bridging nodes, wherein the set of devices is a set of IoT end devices of the IoT network, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a first one of the bridging nodes and comprising:

in response to a predetermined number of failed attempts at establishing a respective connection with one or more bridging nodes and/or one or more end devices, wherein the one or more end devices are each IoT end devices of the IoT network, adding a digital signature of the first bridging node to an input of a first alert transaction, the first alert transaction being a blockchain transaction and comprising a first output, the first output comprising an alert message identifying the one or more bridging nodes and/or the one or more devices, wherein the alert message comprises, for each of the identified one or more bridging nodes and/or one or more devices, a respective number of failed attempted connections between the first bridging node and the identified bridging node or device; and transmitting the first alert transaction to one, some or all of: a different one of the bridging nodes, the registration authority, and one or more nodes of the blockchain network for inclusion in the blockchain.

11. The method of claim 10, comprising, in response to the predetermined number of failed attempts at establishing the respective connection with the one or more bridging nodes and/or the one or more end devices, generating the first alert transaction, wherein said generating of the first alert transaction comprises adding the digital signature of the first bridging node to the alert transaction.

12. The method of claim 10, wherein the registration authority is associated with a public key, and wherein the first alert transaction comprises an output payable to an address based on the public key of the registration authority.

13. The method of claim 10, wherein the first alert transaction comprises a multi-signature output, the multi-signature output comprises a plurality of respective public keys, each public key associated with a respective one of the bridging nodes, and wherein the multi-signature output is configured to, when executed alongside an input of a spending transaction, unlock on condition that the input comprises a predetermined number of respective signatures corresponding to the plurality of respective public keys.

14. The method of claim 10, wherein the first alert transaction comprises a multi-signature output, the multi-signature output comprises a plurality of respective addresses, each address associated with a respective one of the bridging nodes, and wherein the multi-signature output is configured to, when executed alongside an input of a spending transaction, unlock on condition that the input comprises a predetermined number of respective signatures corresponding to the plurality of respective addresses.

15. The method of claim 10, wherein the blockchain comprises a second alert transaction, wherein the second alert transaction comprises a multi-signature output, the multi-signature output comprising a plurality of respective public keys, each public key being associated with a respective one of the bridging nodes, and wherein the multi-signature output is configured to, when executed alongside an input of a spending transaction, unlock on condition that the input comprises a predetermined number of respective signatures corresponding to the plurality of respective public keys, and wherein the input of the first alert transaction spends the multi-signature output of the second alert transaction.

16. The method of claim 10, wherein the blockchain comprises a second alert transaction, wherein the second alert transaction comprises a multi-signature output, the multi-signature output comprising a plurality of respective addresses, each address being associated with a respective one of the bridging nodes, and wherein the multi-signature output is configured to, when executed alongside an input of a spending transaction, unlock on condition that the input comprises a predetermined number of respective signatures corresponding to the plurality of respective addresses, and wherein the input of the first alert transaction spends the multi-signature output of the second alert transaction.

17. The method of claim 10, wherein the alert message comprises, for each of the identified one or more bridging nodes and/or one or more devices, a respective number of failed attempted connections between the first bridging node and the identified bridging node or device.

18. Computer equipment comprising:

memory comprising one or more memory units; and processing apparatus comprising one or more processing units, wherein the memory stores code arranged to run on the processing apparatus, the code being configured so as when run on the processing apparatus the processing apparatus performs a method of revoking access to a first network, wherein the first network is an Internet of Things (IoT) network, wherein the first network comprises a set of bridging nodes and a set of devices controllable by one or more of the set of bridging nodes, wherein the set of devices is a set of IoT end devices of the IoT network, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a registration authority and comprising:

obtaining an alert transaction, the alert transaction being a blockchain transaction and comprising a first output, the first output comprising an alert message identifying one or more bridging nodes and/or one or more devices, wherein the one or more devices are each IoT end devices of the IoT network, wherein the alert message comprises, for each of the identified one or more bridging nodes and/or one or more devices, a respective number of failed attempted connections between one or more bridging nodes and the identified bridging node or device; and revoking access to the first network that is the IoT network by the identified one or more bridging nodes and/or one or more devices by revoking the respective certificate of the identified one or more bridging nodes and/or one or more devices, wherein revoking the respective certificate comprises spending an output from the respective certificate transaction, wherein said revoking comprises revoking access to the first network by the identified one or more bridging nodes and/or one or more devices for which the respective number of failed attempted connections is greater than or equal to a predetermined threshold number of failed attempted connections.

19. A computer program product embodied on a non-transitory computer-readable storage and configured so as, when run on computer equipment, the computer equipment performs a method of revoking access to a first network, wherein the first network is an Internet of Things (IoT) network, wherein the first network comprises a set of bridging nodes and a set of devices controllable by one or more of the set of bridging nodes, wherein the set of devices is a set of IoT end devices of the IoT network, wherein each bridging node is also a respective node of a blockchain network, wherein each bridging node and device is associated with a respective certificate granting access to the first network, and wherein a blockchain comprises, for each bridging node and for each device, a respective certificate transaction comprising the respective certificate of that bridging node or device; the method being performed by a registration authority and comprising:

obtaining an alert transaction, the alert transaction being a blockchain transaction and comprising a first output, the first output comprising an alert message identifying one or more bridging nodes and/or one or more devices, wherein the one or more devices are each IoT end devices of the IoT network, wherein the alert message comprises, for each of the identified one or more bridging nodes and/or one or more devices, a respective number of failed attempted connections between one or more bridging nodes and the identified bridging node or device; and revoking access to the first network that is the IoT network by the identified one or more bridging nodes and/or one or more devices by revoking the respective certificate of the identified one or more bridging nodes and/or one or more devices, wherein revoking the respective certificate comprises spending an output from the respective certificate transaction, wherein said revoking comprises revoking access to the first network by the identified one or more bridging nodes and/or one or more devices for which the respective number of failed attempted connections is greater than or equal to a predetermined threshold number of failed attempted connections.

* * * * *